E. TURNER.
AUTOMATIC GAS AND LIKE REGULATOR.
APPLICATION FILED SEPT. 21, 1917.
1,375,265.
Patented Apr. 19, 1921.
2 SHEETS—SHEET 1.
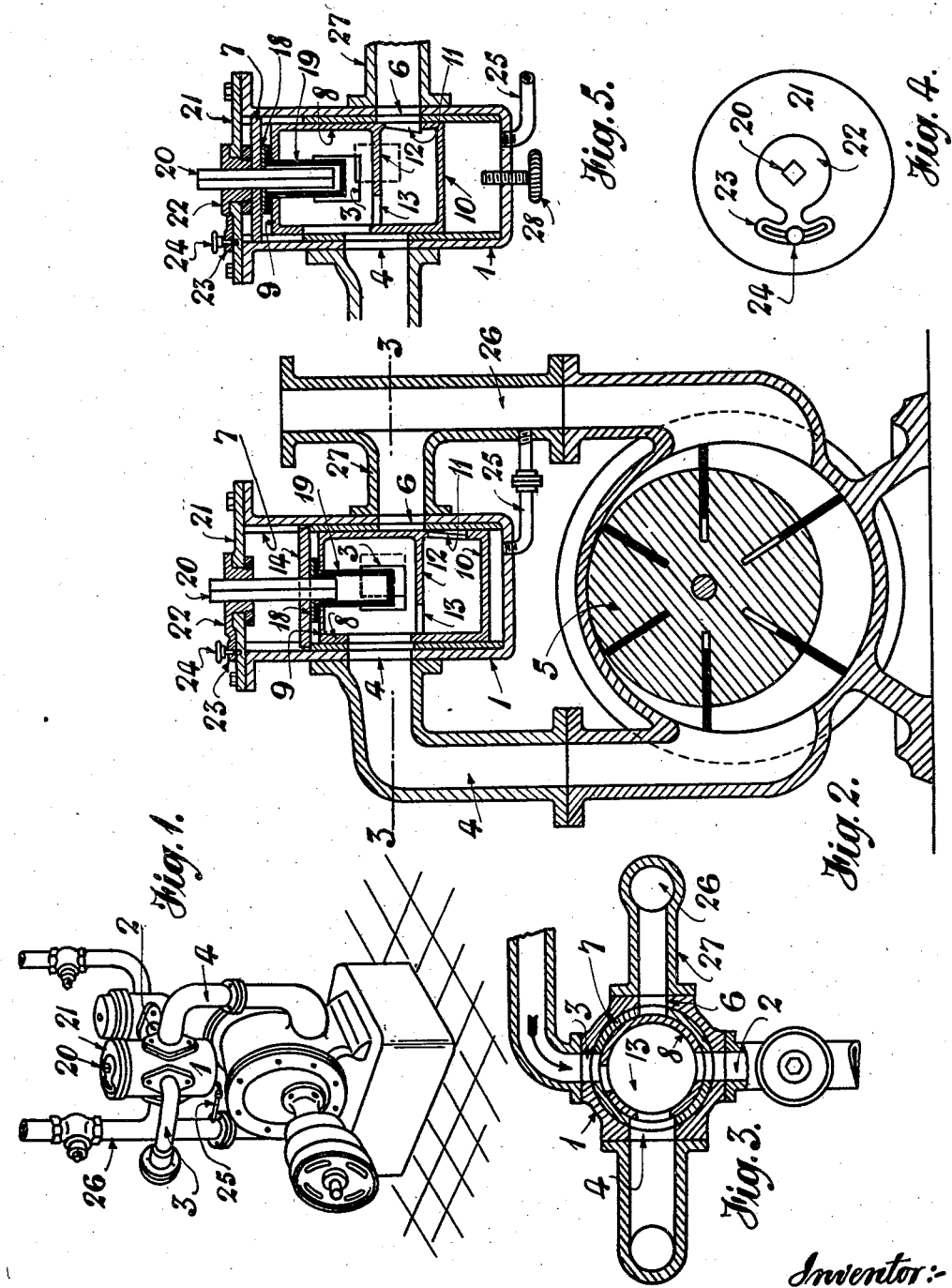
Inventor:-
Ernest Turner
Walter Gunn
By his Attorney:-

E. TURNER.
AUTOMATIC GAS AND LIKE REGULATOR.
APPLICATION FILED SEPT. 21, 1917.

1,375,265.

Patented Apr. 19, 1921.
2 SHEETS—SHEET 2.

Inventor:-
Ernest Turner

By his Attorney:- Walter Turn.

UNITED STATES PATENT OFFICE.

ERNEST TURNER, OF URMSTON, NEAR MANCHESTER, ENGLAND.

AUTOMATIC GAS AND LIKE REGULATOR.

1,375,265. Specification of Letters Patent. Patented Apr. 19, 1921.

Application filed September 21, 1917. Serial No. 192,512.

*To all whom it may concern:*

Be it known that I, ERNEST TURNER, a subject of the King of Great Britain and Ireland, and resident of Urmston, near Manchester, England, have invented certain new and useful Improvements in Automatic Gas and like Regulators, of which the following is a specification.

This invention relates to regulators for automatically regulating the mixture of gases or vapors, and automatically regulating the pressure of the mixture; the chief object of the invention being to allow of the mixing ratio of two or more gases or vapors, or of the pressure and volume of the mixture in the delivery main, being regulated in a simple manner. Other objects are to allow of a constant pressure being maintained in the delivery main once the regulator is adjusted to such pressure; to allow of a constant mixing ratio being preserved between the gases or vapors once the ratio has been adjusted, and further to allow of the mixing ratio, or the pressure of the mixture, to be readily adjusted, and when adjusted to be preserved independently of the volume of gas or gases, passing through the regulator. The improved regulator is intended chiefly for use in the mixing and regulating of gas and air for heating and lighting purposes.

According to the present invention the proportional mixture and the pressure in the delivery main are maintained constant at all rates of flow by a piston valve located in a valve casing, inlet ports being provided in said valve and valve casing, communicating with the respective conduits for the gases or vapors and also with the delivery main. Outlet ports are also provided in the valve and valve casing communicating with a compressor or the like, the arrangement being such that the valve is actuated by hand to regulate the proportions of the mixture while said valve is actuated by the pressure in the delivery main or the suction of the compressor or the like, or by both, to govern the admission of the incoming gases and the pressure in the delivery main, the excess mixture being by-passed back to the compressor or the like.

The invention will be described by the aid of the accompanying drawings, in which:

Figure 1 is a perspective view of a vertically arranged regulator constructed according to the invention.

Figure 2A:
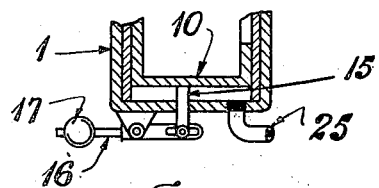
Fig. 2 is a cross-sectional view through the center of the regulator proper.

Fig. 2ª is a modification of a detail of Fig. 2.

Fig. 3 is a sectional plan view on the line 3, 3 of Fig. 2.

Fig. 4 is a plan view of the regulator cover plate.

Fig. 5 is a detail sectional view of the regulator shown in Fig. 2, but with the piston shown raised.

Figure 6:
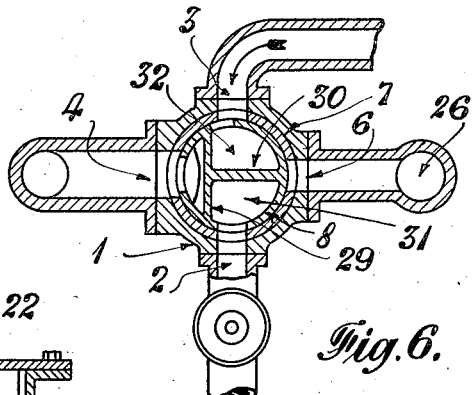

Fig. 6 is a modification of Fig. 3.

Figure 7:
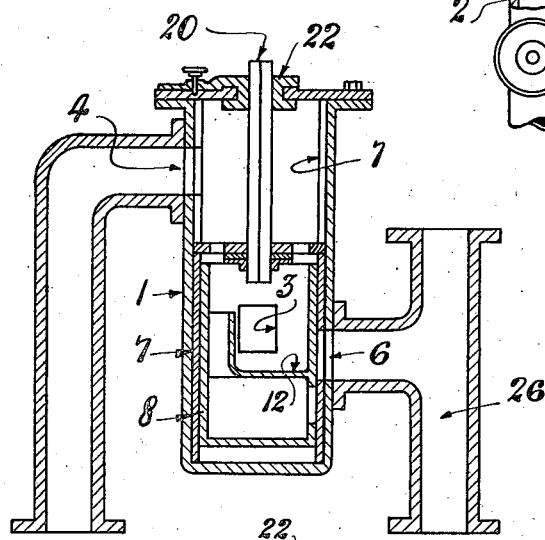
Figure 8:
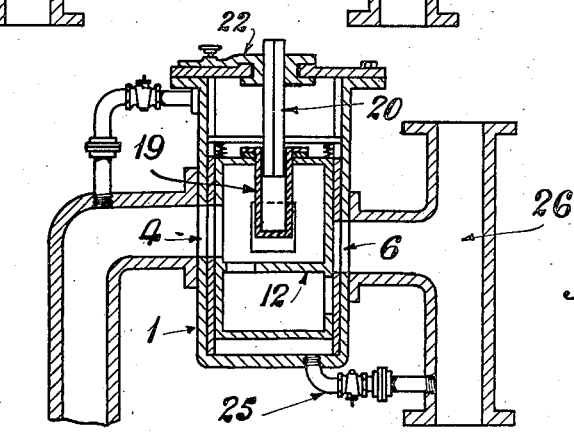

Figs. 7 and 8 are modifications of a detail of Fig. 2.

According to the invention, the improved regulator, which may be arranged to operate in either a vertical or a horizontal position, but preferably vertical as shown, comprises a cylindrical metal casing 1 having a series of branch openings or ports. When the improved regulator is intended for use in the mixing and regulating of gas and air there will usually be four openings or ports, one the gas inlet 2, one the air inlet 3, another the mixture outlet 4 leading to the compressor 5 and a further port or by-pass 6 for by-passing the mixture from the pressure to the suction side of the compressor.

Fixed in the said casing is a machined liner 7 having openings or ports, corresponding in number with those in the casing, said liner facilitates the correct positioning of the ports relatively to the valve ports hereinafter described, but it will be understood that it may be dispensed with and ports of the correct size formed in the casing direct.

Within this liner slidably fits a gas-tight ported piston 8. The ports of the piston correspond in number with those in the liner. All the openings or ports in the liner and piston are preferably rectangular and elongated in shape, except that in the piston for by-passing the mixture, which is preferably triangular or the like in shape.

The inlet port for the gas (or air) in the liner and casing may be made wider than the inlet port in the piston so that, while altering the working area of the opening for the air (or gas) the working area of the opening for the gas (or air) may be constant. The inlet openings may, however, be of corresponding shape and size, but in this case the openings in the piston for the gas or the air is arranged in staggered relationship to the corresponding inlet opening in the casing and liner. The outlet openings in the casing and liner are wider than the outlet opening in the piston as clearly seen in Fig. 3 and the by-pass port 6 is wider than the piston port 11. The piston is closed at its top end 9 and also at its lower end 10, while immediately above the by-pass port 11, a partition 12 is provided. In the example shown the partition 12 is formed with an opening 13 which constitutes a passage for the mixture entering by the by-pass port 11 to escape to the mixture outlet 4. It will, however, be obvious that instead of the opening 13, a further port may be arranged on the suction side of the piston adapted to register with the outlet 4 when the piston is raised to bring the by-pass into circuit.

Loose weights 14, or equivalent loading means are provided to determine the pressure to be put upon the mixture and these weights may rest upon the top of the piston. Preferably however projections on the weights engage slots in the liner, the bottom of said slots supporting the weights in their lowermost position and holding them clear of the piston until the latter is raised sufficiently high to open the inlet ports. With any further upward movement of the piston the weights are also carried upward thereby determining the pressure at which the mixture begins to cut off the supply of gas. If desired, a spring may be carried below the weight or weights to cushion the impact of the piston with the weights.

A spindle 15 may be provided passing through a gland in the bottom of the casing, said spindle being mounted at one end of a pivoted lever 16 provided with an adjustable weight 17 as shown in Fig. 2ª.

To the upper end of the piston 8 and preferably central thereto is fixed a plate 18, said plate having an angular orifice opening into a closed pocket 19 in the piston. Through the said orifice passes a spindle 20 of corresponding angular cross-section, the upper end of which is rotatably mounted in a cross-bar or cap 21 of the regulator casing. By partially rotating the spindle, the piston is given a partial rotation, thereby altering the lateral positions of the ports in the piston relatively to those in the liner and altering the degree of opening for the gas and air. Stops may be provided to limit the partial rotation of the spindle and a nut or the like may be provided to lock the spindle after rotation. This may be conveniently effected by securing the spindle 20 to a fitting 22, which is rotatably secured to the cap or cover plate 21 the arrangement being such that air can escape or enter above the valve 8 so that no pressure vacuum is created above said valve. Said fitting is formed with a slotted quadrant 23, see Fig. 4, which engages a lock screw 24 for adjustment purposes.

The casing 1 below the piston 8 is in communication with the high pressure mixture, through the tube 25 leading from the delivery main 26, as shown, means may be provided to regulate the size of the hole to the required area.

The action of the regulator is as follows: With the casing 1 connected to the gas and air supplies and the mixture outlet 4 coupled to the suction side of the compressor 5, and also with the delivery main 26 connected by a return branch 27 to the regulator casing, the setting in motion of the compressor results in the gas and air being drawn through the piston and compressor in the proportion determined by the angular position of the ports in the piston. As the pressure rises in the delivery main 26 part of the mixture leaks through the small tube 25 into the space below the piston 8, and should the pressure of the mixture be greater than the weight of said piston, it raises the same.

As the pressure increases the piston is further raised until the by-pass port 6 is uncovered, or is in communication with the piston port 11 so that the mixture is by-passed from the pressure to the suction side of the compressor via the opening 13 in the partition 12 as clearly indicated in Fig. 5, the piston continuing to rise until a sufficient quantity of the mixture is by-passed, to lower the pressure to the predetermined limit.

With a subsequent fall of pressure in the delivery main, the piston falls and the by-pass opening gradually closes. In this way, a constant pressure is maintained in the delivery main. Further, by reason of the axial motion only of the piston, the ratio of the mixture is maintained for all pressures and volumes, in addition to the piston constituting a circulation regulator.

Adjustable means, such as the screw 28, may be provided to limit the downward movement of the piston.

The casing 1 and piston 8 may, if desired, be proportioned so that said piston may descend until the inlet ports are also closed on the descent of the piston, when the pressure is removed, thereby positively and automatically cutting off the fluid supply. In this case, the reopening of the ports is effected by the compressor, on being restarted, setting up a pressure in the delivery main, which is communicated, via pipe 25, to the piston, after which the action of the piston is as previously described.

When an appreciable difference in pressure exists between the incoming gases or vapors, the interior of the piston may be divided for a portion of its length into as many chambers as there are inlet ports in the regulator, see Fig. 6, in which the partitions 29 and 30 extend to within a short distance of the horizontal partitions 12. The resultant chambers 31 and 32 thereby open into what may be termed a common chamber which is in communication with the suction port of the regulator as before described.

Instead of the regulator valve or piston being actuated by the high pressure mixture, it may be actuated by the suction of the compressor, see Fig. 7, in which case communication is established between the top of the casing 1 and the suction side of the compressor and the piston is open at the top, the suction port being arranged accordingly, and in this case the bottom of the casing may be open to the atmosphere. Alternatively, the ports may be arranged so that the piston can be operated by both suction and pressure simultaneously as shown in Fig. 8. When the piston is open at the top, the necessity for the pocket 19 is dispensed with and a bridge piece may be provided with a suitable opening to engage the spindle 20, and in this case the member 22 is made gas tight.

What I claim is:—

1. Apparatus for regulating the volume and pressure of fluid mixtures so as to maintain a predetermined proportional mixture and pressure of the gases or vapors irrespective of the rate of flow comprising a valve casing having separate ports communicating with conduits for the fluids to be mixed, with the suction side of a compressor and with the delivery main, a piston valve in said casing and hand operated means to rotate the piston angularly, the arrangement being such that the valve constitutes a combined admission regulator and circulation regulator, substantially as described.

2. An apparatus for regulating the volume and pressure of fluid mixtures so as to maintain a predetermined proportional mixture and pressure of the gases or vapors irrespective of the rate of flow comprising a valve casing having separate ports communicating with conduits for the fluids to be mixed, with the delivery main for the mixed fluids and with the suction and delivery side of a compressor, a piston valve within said casing adapted to control all said ports, means to rotate the piston angularly, and a conduit between the delivery main and the casing to admit pressure to the latter to control the axial movement of the valve, so that the valve constitutes a combined admission regulator and circulation regulator, substantially as described.

3. An apparatus for regulating the volume and pressure of fluid mixtures so as to maintain a predetermined proportional mixture and pressure of the gases or vapors irrespective of the rate of flow comprising a valve casing having separate ports communicating with conduits for the fluids to be mixed, with the delivery main for the mixed fluids and with the suction and delivery side of a compressor, a piston valve within said casing, ports in said valve adapted to communicate with ports in the casing and so arranged as to selectively place all the fluid conduits and the delivery main in communication with the suction side of the compressor, substantially as described.

4. An apparatus for regulating the volume and pressure of fluid mixtures so as to maintain a predetermined proportional mixture and pressure of the gases or vapors irrespective of the rate of flow, comprising fluid conduits, delivery main and compressor, a piston valve and valve casing having ports communicating with the fluid conduits, and with the delivery main and compressor, said ports being arranged around the circumference of the valve and valve casing, hand operated means to adjust the angular position of the valve relatively to the valve casing and a conduit communicating between said casing and the delivery main, substantially as described.

5. An apparatus for regulating the volume and pressure of fluid mixtures so as to maintain a predetermined proportional mixture and pressure of the gases or vapors irrespective of the rate of flow, comprising fluid conduits, delivery main and compressor, and piston valve and valve casing having ports communicating with the fluid conduits, delivery main and compressor, said ports being arranged around the circumferences of the valve and valve casing, the valve being divided into compartments for the various ports all the compartments communicating with the suction side of the compressor together with hand operated means to adjust the angular position of the valve to the valve casing and a conduit communicating between said casing and the delivery main, substantially as described.

In witness whereof I have hereunto set my hand in the presence of two witnesses.

ERNEST TURNER.

Witnesses:
HENRY JUNCA,
ERNALD S. MOSELEY.